United States Patent [19]

Isaacson et al.

[11] Patent Number: 4,845,707
[45] Date of Patent: Jul. 4, 1989

[54] FREQUENCY DIVISION MULTIPLEX/FM MODULATION RECOGNITION SYSTEM

[75] Inventors: Ronald L. Isaacson, Scottsdale; Amy L. Moore-McKee, Phoenix, both of Ariz.

[73] Assignee: Motorola, Inc., Schaumburg, Ill.

[21] Appl. No.: 161,514

[22] Filed: Feb. 29, 1988

[51] Int. Cl.[4] ............................................... H04J 1/00
[52] U.S. Cl. .................................... 370/69.1; 370/120
[58] Field of Search .................. 370/69.1, 120, 70, 74, 370/76

[56] References Cited

U.S. PATENT DOCUMENTS 4,349,903  9/1982  Kobler .................................. 370/69.1
4,398,286  8/1983  Geesen et al. ..................... 370/69.1

Primary Examiner—Robert L. Griffin
Assistant Examiner—Frank M. Scutch, III
Attorney, Agent, or Firm—Frank J. Bogacz

[57] ABSTRACT

A recognition system for comparing energy distributions of incoming emitters with known frequency spectrums is shown. Frequency spectrum analysis of randomly generated signals produces references against which the incoming communication wave may be checked. The recognition system recognizes a plurality of subchannel modulation types. Since there are many different subchannel modulation types in use today, small tactical weapons systems must recognize a number of different signals. Once certain parameters describing each subchannel modulation type are provided to the recognition system, the spectrum analysis of the subchannel modulation types is stored for subsequent use. This system provides for recognizing various FSK signals, PSK signals and OOK signals, as well as being adaptable to tracking other signals which are defined in terms of certain parameters.

34 Claims, 4 Drawing Sheets

FREQUENCY DIVISION MULTIPLEX/FM MODULATION RECOGNITION SYSTEM

BACKGROUND OF THE INVENTION

The present application pertains to frequency division multiplex/frequency modulation (FDM/FM)signal recognition systems and, more particularly, to a system for the recognition of a plurality of subchannel modulation types.

Many tactical weapons systems require the ability to recognition certain signals. Such recognition sometimes involves the detection of frequency division multiplexed/FM signals.

Detection of FDM/FM signals involves recognition of the basic signal structure (i.e. pilot tone frequencies, channel spacing and channel width). In addition, the signal recognition system must sometimes detect the subchannel modulation type (e.g. FSK, PSK, OOK, etc.).

Recognition of a subchannel modulation type is dependent on modulation parameters such as frequency spacing, center frequency and data rates. There are many different subchannel modulation types in use today.

Typical small sized tactical weapon systems are designed to handle the recognition of signals produced by very specific emitters. For each different type of emitter that is to be recognized, the current weapons systems require sweeping hardware and software modifications to recognize each new type of emitter. This results in high costs for such changes and a recognition system which operates only for specific recognition situations.

Accordingly, it is an object of the present invention to provide a low cost FDM/FM signal recognition system which is adaptable to recognize many subchannel modulation types and can be used in small tactical weapons systems.

SUMMARY OF THE INVENTION

In accomplishing the object of the present invention, a novel frequency division multiplex/FM modulation recognition system is shown.

A frequency division multiplexed/FM modulation recognition system first receives a plurality of parameters for each of a plurality of subchannel modulation types. Next, the recognition system produces frequency domain data for a plurality of data sequences including pseudo-random data sequences, for each subchannel modulation type.

A plurality of energy distribution references are generated based upon the energy distribution of the plurality of data sequences which fall below a predetermined percentage of channel energy and also for data sequences which exceed a predetermined percentage of channel energy.

Incoming communication wave signals are converted into frequency domain data representing the energy levels of the communication wave signal. Lastly, the energy levels of the communication wave are compared with the energy distribution references. For a successful comparison, energy distributions of the incoming signal must exceed certain energy distribution references and be less than other energy distribution references that have been determined by the energy distribution analyzer of this invention.

DESCRIPTION OF THE PREFERRED EMBODIMENT

Figure 1:
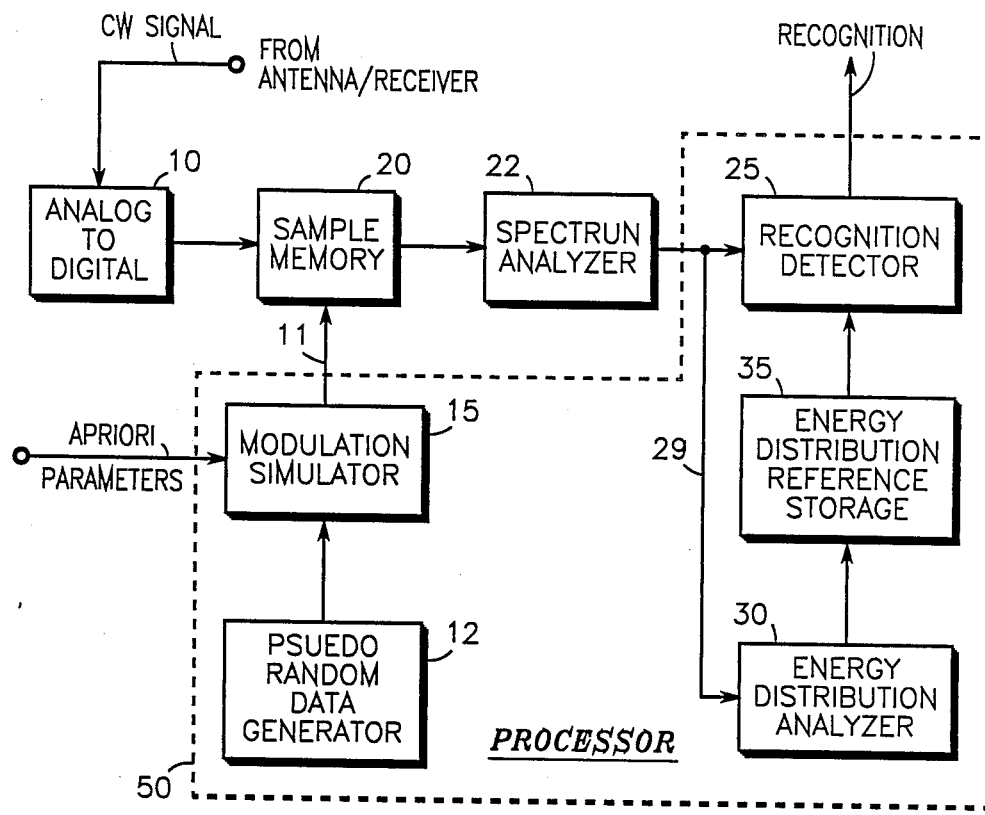
FIG. 1 is a block diagram of an FDM/FM signal recognition system embodying the principles of operation of the present invention.

FIG. 1 is a block diagram depicting a frequency division multiplexed/frequency modulated (FDM/FM) recognition system. Prior to the start of a mission containing the tactical weapons system which includes the invention described in FIG. 1, the aprioi parameters are loaded into modulation simulator 15. The apriori parameters include pilot tone frequencies, channel spacing, channel width, and subcannel modulation types. Three basic subchannel modulation types are shown in the present invention, although the present invention is not limited to these three modulation types. The three modulation types shown are frequency shift keying (FSK), phase shift keying (PSK) and ON-OFF keying (OOK). Several subtypes of FSK signaling are handled by the present system. These subtypes include FSK 800/3200, FSK 1100/2900 and FSK 1400/2600.

In addition to the above-mentioned apriori parameters, for frequency shift keying, the apriori parameters include the high frequency, the low frequency and the data rate. For phase shift keying, the a priori parameters include the center frequency and the data rate. For ON-OFF keying, the a priori parameters include the ON frequency and the data rate. The pseudo-random data generator 12 produces random data streams which are transmitted to modulation simulator 15. These random data streams enable modulation simulator 15 to produce data samples which represent typical data transmissions including noise.

For the subchannel modulation type selected by the apriori parameters, modulation simulator 15 provides a data signal on lead 11 which is transmitted to sample memory 20. For example, if FSK subchannel modulation was selected, modulation simulator 15 produces an FSK representation of the random data generated by generator 12. These data signals are transmitted via lead 11 to sample memory 20. After a predetermined number of samples have been collected by sample memory 20, these simulation signals, which are in the time domain, are transmitted to spectrum analyzer 22.

Spectrum analyzer 22 performs a fast Fourier transform of the time domain simulation signals. As a result, the simulation data are converted to frequency domain data. This frequency domain data is then transmitted to energy distribution analyzer 30 via lead 29.

For the converted simulation data, energy distribution analyzer 30 first divides the frequency spectrum into twenty groups or slices. Next, analyzer 30 determines the average energy contained in each slice of the frequency spectrum as well as the average energy of the whole channel. By analyzing the distribution of energy in a channel (i.e. where the energy falls within the twenty slices), unique patterns may be detected that indicate or specify different subchannel modulation types. Next, energy distribution analyzer 30 generates a set of energy distribution references. These energy distribution references are transmitted to energy distribution reference storage 35 where they are stored for subsequent recognition analysis by recognition detector 25. The recognition analysis using this newly generated set of energy distribution references is performed while the weapons system is performing its mission. The processing of the a priori parameters, described above, is performed prior to the start of the mission. Therefore, this processing does not affect the recognition detection time during the mission.

During the mission, data is received by an antenna/receiver combination (not shown) from a particular source to be recognized. The antenna/receiver combination generates a communication wave (CW) signal shown in FIG. 1. The CW signal is transmitted to analog-to-digital converter 10. After the CW signal is converted to digital form, analog-to-digital converter transfers the data to sample memory 20. After a sufficient number of data samples have been obtained in sample memory 20, this data is transferred to spectrum analyzer 22.

Similar to the operation performed on the apriori parameters, spectrum analyzer 22 performs a fast Fourier transform on the sampled data of the CW signal. The frequency domain representations of the CW signal are then transmitted to recognition detector 25 which performs an algorithm to determine whether the frequency spectrum of the CW signal compares with the energy distribution references previously stored in storage 35.

If the energy distribution references compare with the frequency spectrum of the CW signal, an affirmative indication is produced on the RECOGNITION signal lead. If recognition detector 25 is unable to compare the CW signal frequency spectrum with the stored energy distribution references, a negative indication is provided on the RECOGNITION signal lead. This RECOGNITION lead may then be used by downstream equipment to perform the overall mission of the tactical weapon system.

Pseudo-random data generator 12, modulation simulator 15, recognition detector 25, energy distribution analyzer 30 and energy distribution reference storage 35 each comprise software or a software data structure in the case of storage 35. The software mentioned above executes in processor 50 and resides in an associated memory (not shown). Although processor 50 may be implemented with various microprocessors, for this particular implementation a TMS32020 processor and M68000 processor were selected. The TMS32020 is a digital signal processor that has a 16-bit data bus and 32-bit accumulator and is manufactured by Texas Instruments Incorporated. The M68000 is a 16-bit general purpose microprocessor manufactured by Motorola.

For a given modulation type, the energy distribution of the frequency spectrum of the apriori parameters may vary substantially depending upon the data being modulated. For this reason, selected sets of data are used by the modulation simulator 15 to generate seven different frequency spectrums that represent the range of energy distributions which are likely to be encountered by a FDM/FM system. Table 1 depicts these seven different data combinations.

TABLE 1

| Combination # | Data Combination |
| --- | --- |
| DATA COMBINATIONS | |
| 1 | 70% 0's 30% 1's (pseudo-random sequence) |
| 2 | 30% 0's 70% 1's (pseudo-random sequence) |
| 3 | 50% 0's 50% 1's (pseudo-random sequence) |
| 4 | 100% 0's |
| 5 | 100% 1's |
| 6 | Five 0's, One 1, Three 0's, Two 1's (repeating) |
| 7 | One 0, Five 1's, Two 0's, Three 1's (repeating) |

From these seven sets of converted frequency data, the energy distribution analyzer 30 calculates the minimum percentage of channel energy that can be expected in areas of the frequency spectrum that consistently have significant energy. Next, analyzer 30 calculates the maximum percentage of channel energy that can be expected in the areas of the frequency spectrum that consistently have very little energy. The recognition detector 25 uses these percentages to determine whether a given modulation appears to be present in the incoming CW signal.

Figure 2:
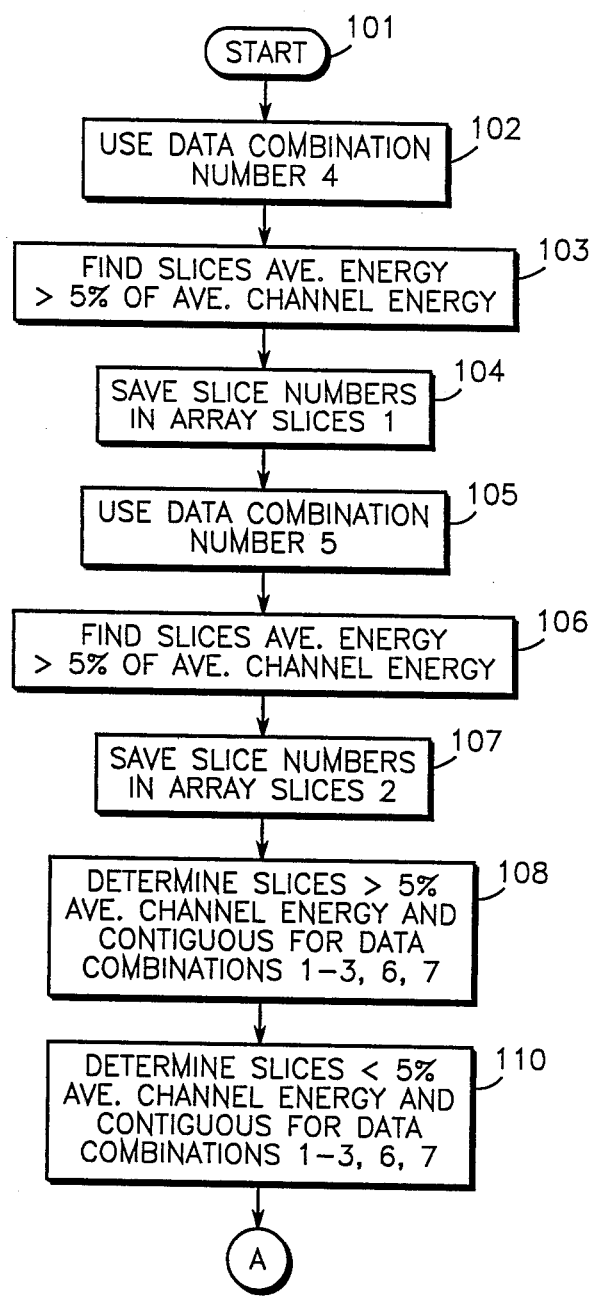
FIGS. 2 through 4 are a flow chart of the operation of the energy distribution analyzer 30 of FIG. 1.
Figure 3:
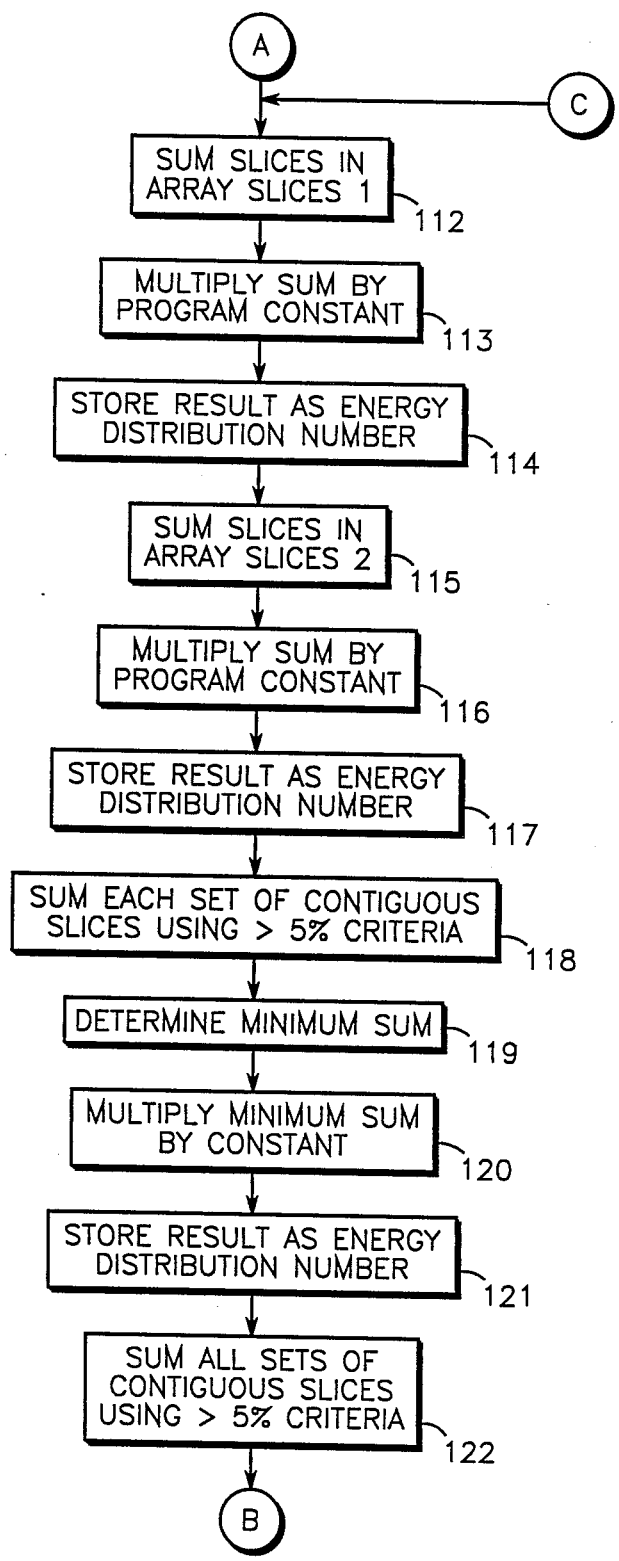
Figure 4:
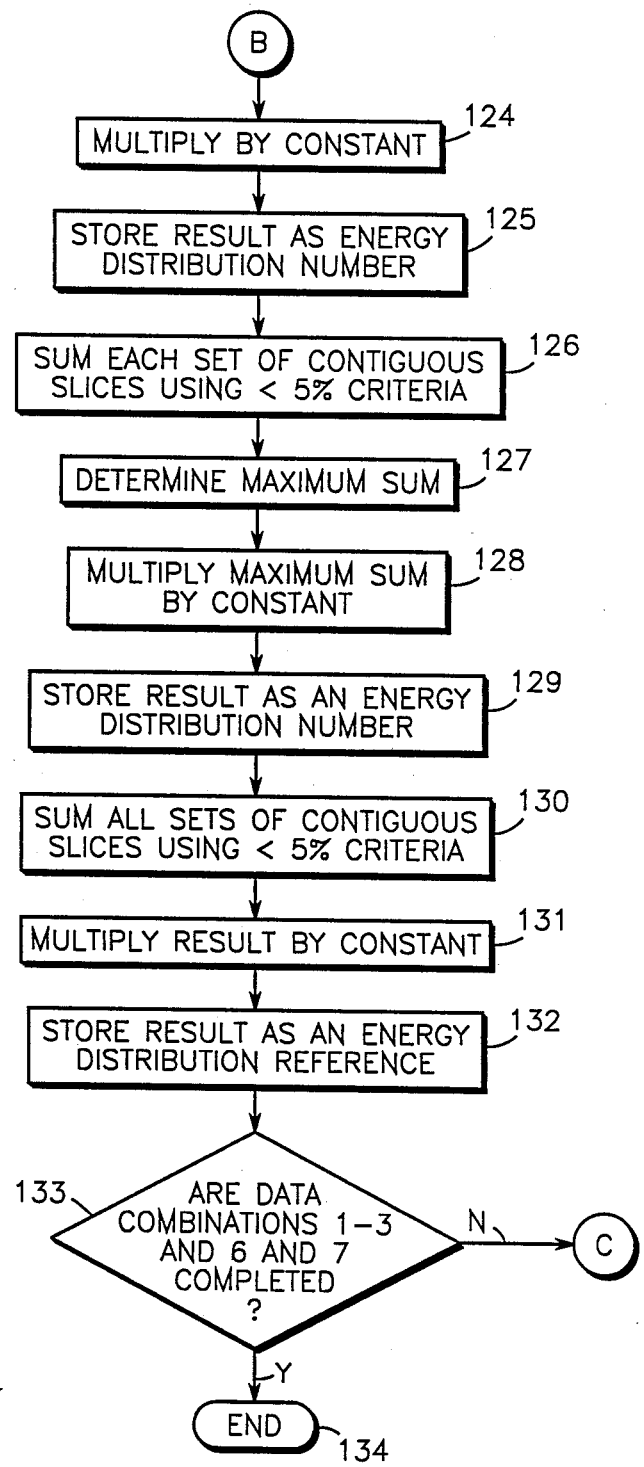

Referring to FIGS. 2 through 4, the software of the energy distribution analyzer 30 of FIG. 1 is shown. When the apriori parameters have been converted by spectrum analyzer 22 and transmitted to energy distribution analyzer 30 via lead 29, the software of energy distribution analyzer 30 is initiated and begins at block 101. Block 102 uses data combination #4 as shown in Table 1, above. Data combination #4 consists of 100% logic 0's. Next, using the input from spectrum analyzer 22, for each of the twenty slices of the channel, all slices whose average energy greater than 5% of the average channel energy are found, block 103. The slice number of each slice having an average energy greater than 5% is saved in an array SLICES 1, block 104.

Next, block 105 uses data combination #5. Data combination #5 consists of 100% logic 1's. The number of the slices whose average energy is greater than 5% of the average channel energy are found using data combination #5, block 106. Each of the slice numbers whose average channel energy is greater than 5% is stored in an array SLICES 2, block 107.

For each of the data combinations 1 through 3, 6 and 7, the slice numbers are found for those slices which have an average channel energy greater than 5% and which are contiguous, block 108. Contiguous slices mean those slices which are numerically adjacent to one another without interruption. For example, if slices 1, 4, 5, 6, 10 and 11 are found to have average channel energy greater than 5%, then slice number 1 forms a contiguous set, slices 4, 5 and 6 form a contiguous set and slices 10 and 11 form a contiguous set. The slice numbers are also determined for each data combination 1 through 3, 6 and 7, as shown in Table 1.

Next, for data combinations 1 through 3, 6 and 7, block 110 determines those slices which have an average channel energy less than 5% of the average channel energy and which are contiguous. Contiguous channels are those as described above for block 108. The slice numbers are also determined for each data combination 1 through 3, 6 and 7, as shown in Table 1.

The sum of each of the slices in array SLICES 1 is found, block 112. Next, this sum is multiplied by a program constant, block 113. This program constant is empirically determined and is initially set at 0.5. Changes in this program constant will affect the probability of detection using the various data combinations. The result of the multiplication is stored as an energy distribution number in storage 35 of FIG. 1, block 114.

Block 115 sums the energy of the slices indicated in array SLICES 2. The sum is multiplied by the program constant mentioned above, block 116. The result is stored as an energy distribution number, block 117.

Next, the energy of each of the contiguous sets, using the greater than 5% criteria which were previously found by block 108, is summed, block 118. For example, if the contiguous sets are 4, 5 and 6 and 10 and 11, slices 4, 5 and 6 form one set and 10 and 11 form another set. For this example, block 118 would sum the energy of slices 4, 5 and 6 as one set and the energy of slices 10 and 11 as another set. Block 119 determines the minimum sum for each of the sets found by block 118. The minimum sum is multiplied by the constant 0.5, block 120. The result of the multiplication is stored as an energy distribution number, block 121.

Block 122 sums all sets of contiguous slices, using the greater than 5% criteria which was previously found by block 108. For the example mentioned above, the sum would consist of the energy of slices 4, 5, 6, 10 and 11. This sum is multiplied by the program constant 0.5, block 124. The result is stored as an energy distribution number, block 125.

Next, each of the sets of contiguous slices, using the less than 5% criteria which were previously found by block 110, is summed, block 126. Again with our example of contiguous slices 4, 5, 6, 10 and 11, blocks 4, 5 and 6 would be summed as one set and blocks 10 and 11 would be summed as another set. When the energies of each contiguous set have been summed, block 127 determines the maximum sum. The maximum sum is multiplied by the program constant 0.5, block 128. The result is stored as an energy distribution number, block 129.

Block 130 sums the energy of all the sets of contiguous slices, using the less than 5% criteria which were previously found by block 110. In our example, this would be slices 4, 5, 6, 10 and 11. The resultant sum is multiplied by the program constant 0.5, block 131. The result is stored as an energy distribution reference, block 132.

Block 133 determines whether the data combinations 1 through 3 and 6 and 7 have all been performed. When all of the data combinations have not been used, the next data combination is selected and blocks 112 through 133 are iterated, block 133 transfers control via the N path to block 112. When blocks 112 through 133 have been iterated for each of the data combinations 1 through 3, 6 and 7, the Y path is followed from block 133 and the program is ended, block 134.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a frequency division multiplex/frequency modulation signal recognition system including a processor, a method for producing energy distribution references for a plurality of subchannel modulation types, said method comprising the steps of:

receiving a plurality of parameters for each subchannel modulation types;

generating frequency domain data for a plurality of data sequences for each of said subchannel modulation types;

segmenting said frequency domain data of each subchannel modulation type for each data sequence into a predetermined number of segments;

first determining a first sum of energy levels of said frequency domain data for segments having an energy level greater than a predetermined percentage of an average energy level for certain ones of said plurality of data sequences and a second sum of energy levels for segments having an energy level greater than said predetermined percentage of an average energy level for certain ones of said plurality of data sequences;

first converting said first and second sums to corresponding first and second energy distribution references;

second determining a third sum of energy levels of said frequency domain data of numerically contiguous sets of segments for segments greater than said predetermined percentage, which sum is a minimum energy level;

second converting said third sum to a third energy distribution reference;

third determining a fourth sum of energy levels of said frequency domain data for all sets of numerically contiguous sets of segments for segments greater than said predetermined percentage;

third converting said fourth sum to a fourth energy distribution reference;

fourth determining a fifth sum of energy levels of said frequency domain data of numerically contiguous sets of segments for segments less than said predetermined percentage, which sum is a maximum energy level;

fourth converting said fifth sum to a fifth energy distribution reference;

fifth determining a sixth sum of energy levels of said frequency domain data for all said sets of numerically contiguous segments for segments less than said predetermined percentage; and fifth converting said sixth sum to a sixth energy distribution reference.

2. A method for producing energy distribution references as claimed in claim 1, said step of generating including the steps of:

first generating each of said plurality of data sequences;

second generating pluralities of subchannel modulation data corresponding to each of said pluralities of data sequences; and sixth converting each of said pluralities of subchannel modulation data to corresponding pluralities of frequency domain data.

3. A method for producing energy distribution references as claimed in claim 2, said step of sixth converting including the step of storing samples of each of said plurality of subchannel modulation data in a memory.

4. A method for producing energy distribution references as claimed in claim 3, said step of sixth converting further including the step of applying a Fast Fourier Transforms to each stored subchannel modulation data to produce said frequency domain data.

5. A method for producing energy distribution references as claimed in claim 4, said step of segmenting said frequency domain data into a predetermined number of segments including the step of dividing said frequency domain data into approximately twenty segments.

6. A method for producing energy distribution references as claimed in claim 5, said step of first determining including the steps of:

finding a segment number of each segment having a corresponding energy level greater than approximately 5% of an average channel energy level for a first data sequence; and storing said segment number and said corresponding energy level in a first array.

7. A method for producing energy distribution references as claimed in claim 6, said step of first determining further including the steps of:

second finding each segment number having a corresponding energy level greater than approximately 5% of the average energy level for a second data sequence; and storing said segment numbers and said corresponding energy levels in a second array.

8. A method for producing energy distribution references as claimed in claim 7, wherein there is further included the steps of:

third finding all segment numbers having a corresponding energy level greater than approximately 5% of an average energy level and being numerically contiguous with other segments; and first iterating said step of third finding for third through seventh data sequences.

9. A method for producing energy distribution references as claimed in claim 8, wherein there is further included the steps of:

fourth finding all segment numbers having a corresponding energy level less than approximately 5% of said average energy level and being numerically contiguous with other segments; and second iterating said step of fourth finding for said third through seventh data sequences.

10. A method for producing energy distribution references as claimed in claim 9, said step of first determining further including the step of summing each of said energy levels of said first array to produce said first sum.

11. A method for producing energy distribution references as claimed in claim 10, said step of first converting including the steps of:

multiplying said first sum by a predetermined constant to produce said first energy distribution reference; and storing said first energy distribution reference.

12. A method for producing energy distribution references as claimed in claim 9, said step of first determining further including the step of summing each of said energy levels of said second array to produce said second sum.

13. A method for producing energy distribution references as claimed in claim 12, said step of first converting further including the steps of:

multiplying said second sum by a predetermined constant to produce said second energy distribution reference; and storing said second energy distribution reference.

14. A method for producing energy distribution references as claimed in claim 9, said step of said second determining including the steps of:

grouping energy levels of each of said numerically contiguous segments into a set for segments greater than approximately 5% of an average energy level;

summing each of the sets of energy levels; and fifth finding a minimum sum of said sets of sums.

15. A method for producing energy distribution references as claimed in claim 14, said step of second converting including the steps of:

multiplying said minimum sum by a predetermined constant to produce said third energy distribution reference; and storing said third energy distribution reference.

16. A method for producing energy distribution references as claimed in claim 9, said step of third determining including the step of summing said energy levels of all said sets of contiguous segments for segments greater than approximately 5% of an average energy level to produce said fourth sum.

17. A method for producing energy distribution references as claimed in claim 16, said step of third converting including the steps of:

multiplying said fourth sum by a predetermined constant to produce said fourth energy distribution reference; and storing said fourth energy distribution reference.

18. A method for producing energy distribution references as claimed in claim 9, said step of fourth determining including the steps of:

grouping energy levels of each of said numerically contiguous segments into a set for segments less than approximately 5% of an average energy level;

summing each of said sets of said energy levels; and finding a maximum sum of said sets of sums.

19. A method for producing energy distribution references as claimed in claim 18, said step of fourth converting including the steps of:

multiplying said maximum sum by a predetermined constant to produce said fifth energy distribution reference; and storing said fifth energy distribution reference.

20. A method for producing energy distribution references as claimed in claim 9, said step of fifth determining including the step of summing said energy levels of all said sets of contiguous segments less than approximately 5% of an average energy level to produce said sixth sum.

21. A method for producing energy distribution references as claimed in claim 20, said step of fifth converting including the steps of:

multiplying said sixth sum by a predetermined constant to produce said sixth energy distribution reference; and storing said sixth energy distribution reference.

22. A method for producing energy distribution references as claimed in claim 9, wherein there is further included the step of third iterating each of the steps of claims 10 through 21 for third through said seventh data sequences.

23. A method for producing energy distribution references as claimed in claim 21, wherein there is further included the step of modifying said predetermined constant.

24. A method for producing energy distribution references as claimed in claim 23, said predetermined constant being approximately equal to 0.5.

25. A method for producing energy distribution references as claimed in claim 1, wherein there is further included the step of iterating said steps of:

receiving;

generating;

segmenting;

first, second, third, fourth and fifth determining; and first, second, third, fourth and fifth converting for each subchannel modulation type.

26. A method for recognizing a plurality of FDM/FM subchannel modulation types from a communication wave signal comprising the steps of:
receiving a plurality of parameters describing each subchannel modulation type;
producing a plurality of subchannel modulation data and of corresponding frequency domain data describing energy levels associated with a plurality of data sequences for each subchannel modulation type;
generating a plurality of energy distribution references from said frequency domain data for each of said subchannel modulation types;
converting said communication wave signal to frequency domain data representing an energy distribution of said communication wave signal; and
comparing said frequency domain data of said communication wave signal with said energy distribution references to produce a recognition signal of a first value for comparison of said frequency domain data of said communication wave signal with said energy distribution references and to produce a recognition signal of a second value for miscomparison of said frequency domain data of said communication wave signal with said energy distribution references.

27. A method for recognizing as claimed in claim 26, said step of producing including the steps of:
second generating a plurality of data sequences including pluralities of pseudo-random data sequences; and
third generating subchannel modulation data for each of said plurality of data sequences.

28. A method for recognizing as claimed in claim 27, said step of producing further including the steps of:
sampling said subchannel modulation data for each of said data sequences;
storing said samples of said subchannel modulation data for each of said data sequences; and
converting said sampled subchannel modulation data to corresponding energy distributions of said frequency domain data.

29. A method for recognizing as claimed in claim 28, said step of generating including the steps of:
dividing each subchannel into a predetermined number of segments;
first determining segments having energy levels below a predetermined percentage for a first group of segments and producing a first plurality of energy distribution references;
second determining said segments having energy levels greater than said predetermined percentage of energy for a second group of segments and producing a second plurality of energy distribution references;
second. storing said first and second pluralities of energy distribution references; and
iterating said steps of dividing, first determining, second determining and second storing for each of said plurality of data sequences.

30. A method for recognizing as claimed in claim 29, said step of converting including the steps of:
second converting said communication wave signal from analog to digital form;
second sampling said converted communication wave signal;
third storing said sampled communication wave signal; and
fourth converting said stored samples said communication wave signal to energy level data of said frequency domain.

31. A method for recognizing as claimed in claim 26, wherein there is further included the step of iterating said steps of receiving, producing, generating, converting and comparing for each of said subchannel modulation types.

32. A FDM/FM system for recognizing various subchannel modulation types from a communication wave, said FDM/FM system comprising:
means for converting said communication wave to frequency domain energy distribution data;
processor means connected to said means for converting, said processor means producing a recognition signal for a comparison of said energy distribution data of said communication wave with calculated energy distribution data;
said processor means including:
first logic means operating in response to input parameters to produce subchannel modulation data for a plurality of data sequences; said FDM/FM system further comprising:
said means for converting operating to convert said subchannel modulation data to frequency domain energy distribution data;
said processor means further including:
second logic means operating in response to said converted subchannel modulation data to produce pluralities of energy distribution references for each of said pluralities of data sequences; and
third logic means for comparing said energy distribution references and said energy distribution data of said communication wave to produce a first value of said recognition signal for a comparison and to produce a second value of said recognition signal for a miscomparison.

33. A FDM/FM system as claimed in claim 32, said means for converting including:
analog to digital conversion means for converting said communication wave to digital form;
sampling means connected to said analog to digital conversion means and operating to produce digital samples of said communication wave; and
spectrum analysis means connected to said sampling means and to said processor means, said spectrum analysis means producing said frequency domain energy distribution data.

34. A FDM/FM system as claimed in claim 33, said first logic means including:
data generator means for producing pseudo-random data and for producing pluralities of repeating predefined data sequences; and
modulation means connected to said sampling means and operating to produce said modulation data for each of said input parameters.

* * * * *